Figure 1:
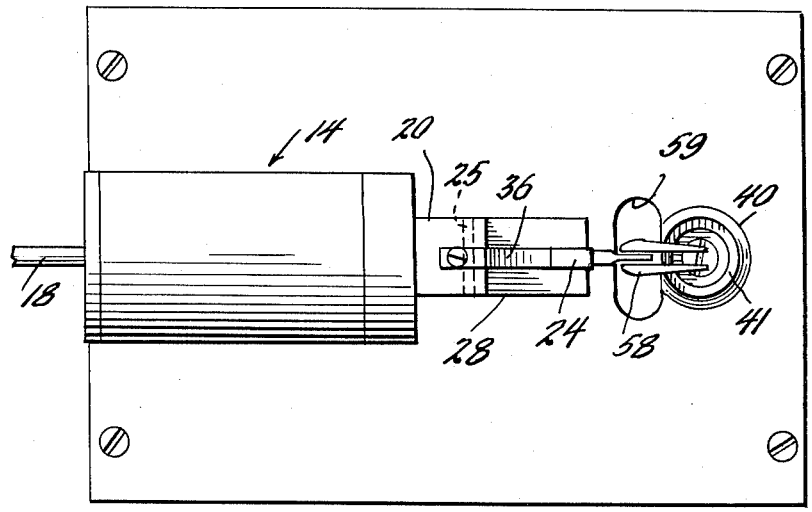

June 18, 1963 T. B. EDDY 3,093,895
WIRE COIL INSTALLING TOOL
Filed Oct. 16, 1961 2 Sheets-Sheet 2
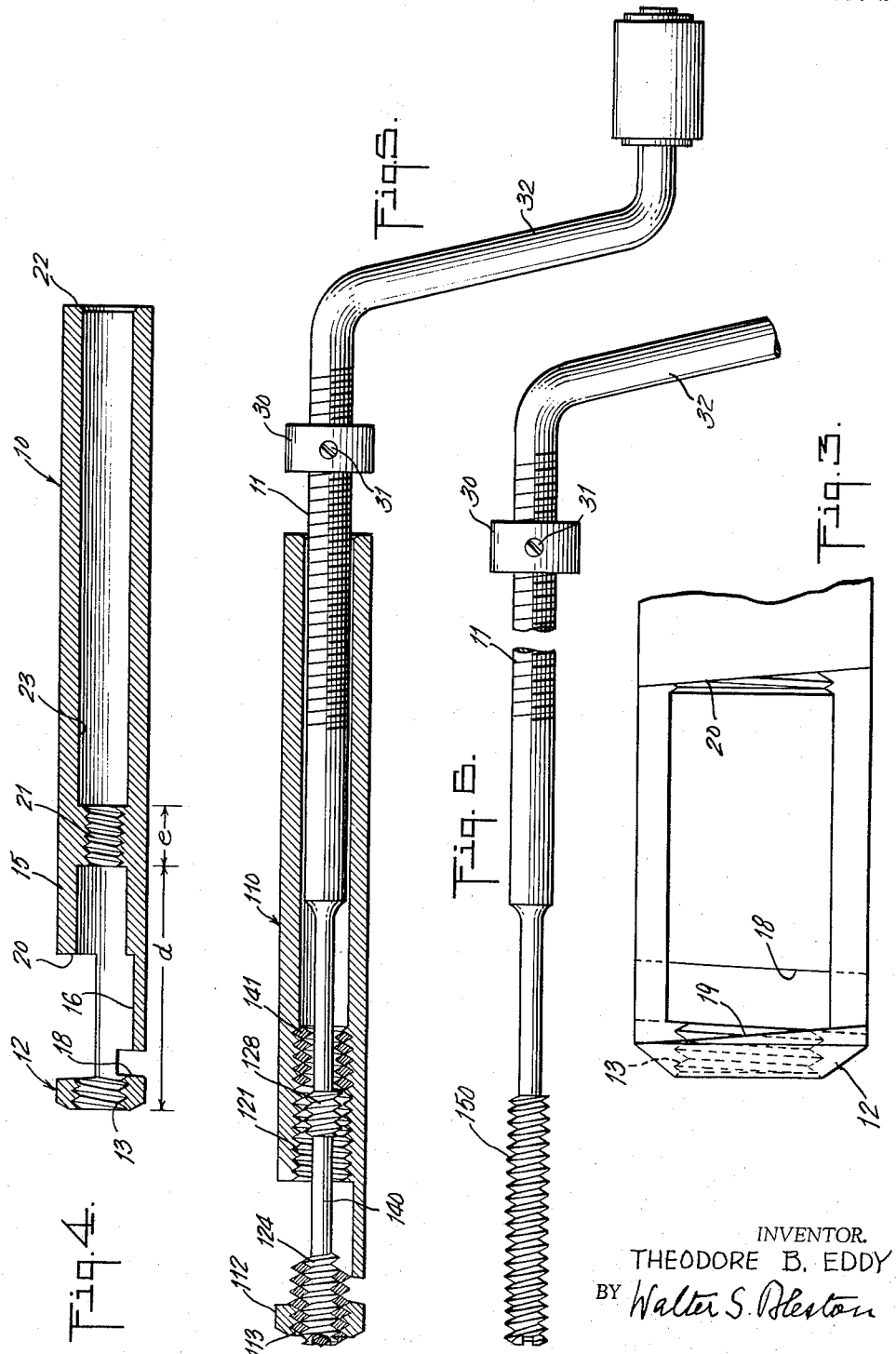
INVENTOR.
THEODORE B. EDDY
BY Walter S. Pleston
ATTORNEY

United States Patent Office 3,093,895
Patented June 18, 1963

3,093,895
WIRE COIL INSTALLING TOOL
Theodore B. Eddy, Brookfield, Conn., assignor to Heli-Coil Corporation, Danbury, Conn., a corporation of Delaware
Filed Oct. 16, 1961, Ser. No. 145,391
11 Claims. (Cl. 29—240.5)

The invention relates to a tool for installing a wire coil screw thread insert in a tapped hole. Special tools are required for the indicated purpose inasmuch as such screw thread inserts, quite in general, are coiled of wire with an outer diameter larger than that of the tapped threads into which they are to be fitted. Such overdimensioning is required to provide for a safe and secure seating of an insert in a tapped hole. In order, however, to accomplish the installation the insert must be contracted. Conventionally the insert is provided with a diametrical tang serving as a grip at the insert end which leads during the installation. The usual inserting tool comprises a tubular body into which an insert can be charged, and a generally smooth, rod-like mandrel which is rotatable and axially shiftable in that body. The mandrel is provided with a slot at its end for gripping the tang from the interior of the insert coil in order to screw it through an interiorly threaded prewinder foot portion of the tool body, the thread diameter of which is usually slightly smaller than that of the tapped thread of the work piece. By screwing the insert through such prewinder foot which is placed on the work piece coaxial with the tapped hole, the wire coil gripped and rotated by the mandrel will be screwed through the prewinder foot and thereby contracted and so readily screwed into the tapped hole.

However, the conventional tool for this purpose has the drawback that the insert frequently crosses the thread of the prewinder foot when the mandrel is pushed into it at a controlled or non-controlled rate, which thus causes a faulty installation.

Therefore a main object of the invention is the provision of a prewinder tool in which the occurrence of a cross-threading is practically eliminated.

The invention further aims to provide means properly to lead an insert into the thread of a prewinder foot.

Another object of the invention is the provision of a prewinder tool in which the insert is properly anchored to the mandrel while being screwed in, and in which the mandrel is so guided in relation to the prewinder foot that the insert enters the thread of the latter in a proper position, i.e. in the exact phase as to the start of the outer screw thread of the insert on the mandrel and the start of the inner screw thread of the prewinder, and that the insert is positively advanced during the rotation according to the pitch of the prewinder thread which is equal to that of the tapped thread of the work piece.

It is also an object of the invention so to slot and form the mandrel end that it can readily grip the conventional diametrical tang of an insert in order to take the insert along when the mandrel turns in the one direction, and that the mandrel end withdraws from the tang after the installation of an insert upon rotation of the mandrel in the opposite direction.

Figure 2:
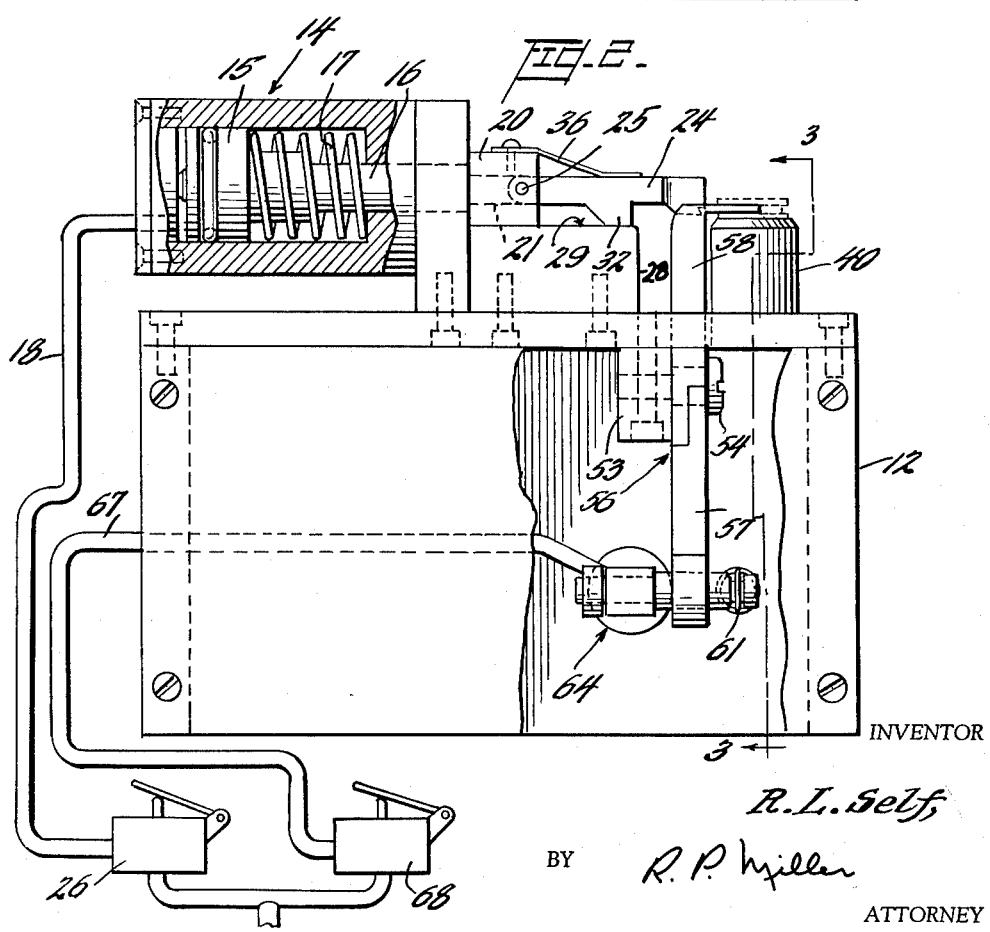

Further details and objects of the invention will be apparent from the description given hereinafter and the accompanying drawing illustrating embodiments thereof by way of example. In the drawing:

FIG. 1 is a longitudinal cross-section of a tool according to the invention comprising a tool body and a mandrel, FIG. 2 is a side elevation on a larger scale of the free end portion of the mandrel in FIG. 1, FIG. 2a is another side elevation of the mandrel end at 90° from FIG. 2, FIG. 2b is an end view of the mandrel end, FIG. 3 is a top plan view, also on a larger scale, of the foot end of the tool, FIG. 4 is a longitudinal section of the tool body of FIG. 1, FIG. 5 is a longitudinal section of a modification, and FIG. 6 is an amended portion of a mandrel.

Referring now to the drawing, FIGS. 1 to 5, the tool comprises the tubular prewinder body generally denoted by 10, and the mandrel in general denoted by 11. The front end of the body 10 is formed as the prewinder foot 12 having an axial extension of at least one turn of an inner thread 13, which may be of the same or a very slightly smaller major diameter than the tapped hole of the work piece to be lined with the insert. The ultimate end of the foot 12 may be beveled at 14. Between the main portion 15 of the body 10 and the foot 12, the wall is partly removed in order to form a laterally open charging chamber 16 for a conventional wire coil insert of a type indicated at 17 which has inner and outer screw thread forming portions. In order to ensure a proper entrance of the insert into the prewinder foot 12 as it will be described hereinafter, an abrupt thread start of the thread 13 is obtained by cutting openings 16 and 18 in the prewinder body at the thread helix angle as apparent at 19 particularly in FIG. 3, wherein the surface 19 passes through the centerline of the crest of the thread. Starting at a distance $d$ from the ultimate end of the foot 12 an inner, nut forming thread 21 is provided which extends a distance $e$ towards the open end 22 of the body 15. Otherwise the body 15 has a smooth inner cylindrical surface 23.

The mandrel 11, which is inserted in the body 10, has a front end with an exterior screw thread thereon to receive the insert 17 with the tang 26 of the latter engaging a slot 25 in the front face. The thread 24 has a diameter approximately equal to that of the inner screw thread forming portion of an insert when contracted by the prewinder foot. The mandrel end is specifically so formed that the insert tang 26 can readily enter the slot and be turned by the mandrel when the latter rotates in the one direction, and that the mandrel can be disengaged and freely withdrawn from the tang upon rotation in the opposite direction after the insert has been installed in a work piece. For this purpose the mandrel end of the illustrated embodiment is shaped according to FIGS. 2, 2a and 2b. Slot 25 forms two extensions 40 and 41 between the walls 42 and 43 of which the slot is located. The slot 25 extends from its open end 44 diametrically but not fully across the mandrel and has its opposite end 45 at a slight distance from the crest 46 of the top-most or end convolution 47 of the mandrel thread 24, so as to leave the thread at this point uninterrupted and to prevent the tang from engaging the slot in a wrong position. The slot may slant down from the end 45 to the end 44. The ultimate end portion 48 of the mandrel is located at the extension 40 close to the open slot end 44. At this portion 48 the side wall 42 constitutes an abutment for the root of the tang when the mandrel rotates so as to install an insert into a work piece. From portion 48 the end face of the mandrel extension 40 slopes down at 49 to the end 45 of the slot 25. A second abutment, namely, for the end of the tang, is formed at an apex 50 of the wall 43 at a point nearer to the end 45 than to the end 44 of the slot. From apex 40, the extension 41 slopes down at 51 to the end 44 of slot 25. There may or may not be another slope 52 on the other side of the apex 50. Thus, when the mandrel end screws into the insert which is to be installed the tang can ride on the slopes 49 and 51 to enter the slot 25. Upon further rotation of the mandrel the slot walls, especially the portions at 48 and 50, will take the tang along and upon a reversal of wardly of said foot portion, and means at the other end of the mandrel to apply a torque thereto.

2. A prewinder tool as in claim 1, wherein all said threads are of equal pitch, the threads of one of the pairs comprising the pair of interior body threads and the pair of exterior mandrel thread portions being one half pitch out of phase in respect to each other whereas the threads of the other pair are in phase.

3. A prewinder tool as in claim 1 wherein an opening in the form of a slot at the helix angle of the thread of said foot is provided in said body at the chamber end of said foot thereby creating an abrupt thread start at the prewinder foot.

4. A prewinder tool as in claim 3 wherein the thread of said mandrel is in two portions, the first portion starting at the slotted end having a length somewhat less than the length of said chamber, the second portion being spaced from the first one by a mandrel portion of a length similar to the length of said chamber.

5. A prewinder tool as in claim 4, wherein the two portions of the mandrel thread are of equal thread form and size.

6. A prewinder tool as in claim 1, the thread of said nut portion corresponding to the inner screw thread forming portion of the insert when contracted, and being of the same pitch but one half of a pitch out of phase with said foot portion of said body.

7. A prewinder tool as in claim 6, wherein said nut forming portion includes an inner thread being the continuation on the opposite end of said chamber of the thread of said foot portion as to shape, pitch and phase, and an insert of the kind to be installed in a work piece with the aid of the tool, being permanently inserted into said continued thread.

8. A prewinder tool as in claim 6 wherein said mandrel thread in through-going and of such a length that it can be simultaneously in engagement with said nut thread and project from said foot portion a predetermined distance.

9. A prewinder tool as in claim 1, said slot extending diametrically from one open end at one side of the mandrel not fully across to the other mandrel side so as to form two mandrel extensions between the walls of which said slot is located, the first one of said walls having a portion constituting an abutment for the root of said tang, and the second one of said walls having a portion constituting an abutment for the end of said tang, said first wall sloping down from its abutment portion to the slot end opposite said open end, and said second wall sloping down from its abutment portion to said open slot end.

10. A prewinder tool as in claim 9, said abutment portion of said second wall forming an apex closer to said opposite than to said open end of said slot and sloping down to either slot end.

11. A prewinder tool as in claim 10 wherein the bottom of said slot slopes down from said opposite to said open slot end, and said apex is somewhat lower than the portion of said first wall near the open slot end.

No references cited.

June 18, 1963  R. L. SELF  3,093,896
METHOD OF MANIPULATING ARTICLES
Original Filed Sept. 3, 1957  3 Sheets-Sheet 1

INVENTOR
R. L. Self,
BY R. P. Miller
ATTORNEY